US009121669B1

(12) United States Patent
Hyslop et al.

(10) Patent No.: US 9,121,669 B1
(45) Date of Patent: Sep. 1, 2015

(54) SYSTEM AND METHOD FOR DESIGNATING A TARGET FOR A REMOTE AERIAL VEHICLE

(75) Inventors: Gregory L. Hyslop, Kirkwood, MO (US); John W. Kraemer, Ballwin, MO (US); Kurt A. Mizgate, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 08/300,378

(22) Filed: Sep. 2, 1994

(51) Int. Cl.
*F41G 7/22* (2006.01)
*G05D 1/00* (2006.01)

(52) U.S. Cl.
CPC ............ *F41G 7/2206* (2013.01); *G05D 1/0033* (2013.01); *B64C 2201/121* (2013.01); *B64C 2201/146* (2013.01)

(58) Field of Classification Search
USPC ......... 244/3.11, 3.14; 701/2, 3; 348/113, 114, 348/117, 144, 148
See application file for complete search history.

(56) References Cited

U.S. PATENT DOCUMENTS

| 3,567,163 | A | * | 3/1971 | Kepp et al. | .................... | 244/3.14 |
| 3,729,151 | A | * | 4/1973 | Hecker | ........................ | 244/3.14 |
| 4,152,724 | A | * | 5/1979 | Hunter | ......................... | 244/3.11 |
| 4,611,771 | A | * | 9/1986 | Gibbons et al. | .............. | 244/3.11 |
| 5,027,202 | A | * | 6/1991 | von Hoessle et al. | ......... | 348/144 |

FOREIGN PATENT DOCUMENTS

DE          3141872 A1 *  5/1983  ............. G01C 21/14

* cited by examiner

*Primary Examiner* — Joseph W Sanderson
(74) *Attorney, Agent, or Firm* — Alston & Bird LLP (57) ABSTRACT

A system and method of guiding a remote aerial vehicle toward a designated target includes an imaging sensor which generates sequential video images of the target area from the remote aerial vehicle and transmits the images to a control center via the video portion of a communications data link. The control center receives and displays the plurality of video images on a video display. An image selection signal is generated at the control center and transmitted to the remote aerial vehicle for commanding the imaging sensor to continuously transmit one of the sequential video images. A target designation signal, corresponding to the azimuth and elevation of the desired target on the continuously displayed video image, is generated and transmitted via a command portion of the data link to the remote aerial vehicle. The target designation signal is processed and an updated target position is computed to compensate for time delays. A tracker tracks the updated target position to thereby guide the remote aerial vehicle toward the designated target. The video images and the target designation signal may be transmitted at low bandwidth frequencies to a satellite and relayed to the control center and the remote aerial vehicle respectively.

20 Claims, 5 Drawing Sheets

SYSTEM AND METHOD FOR DESIGNATING A TARGET FOR A REMOTE AERIAL VEHICLE

FIELD OF THE INVENTION

The present invention relates to real-time target designation for a remote aerial vehicle, and more particularly to man-in-the-loop (MITL) control of an airborne missile.

BACKGROUND OF THE INVENTION

MITL control of remote aerial vehicles provides a level of accuracy and real-time adaptability which fully autonomous systems generally cannot provide. Thus, MITL control is commonly used to designate a desired target for an airborne missile. MITL control of an airborne missile is typically accomplished by a terminal sensor mounted in the nose of the missile which transmits sequential video images of the target area, via the video portion of a communications data link, to a control center.

The control center is equipped to receive and display the sequential video images to an operator. The operator designates the target, or aimpoint, from the video images on the display. The position of the target on the display is then transmitted, in the form of a target designation signal, to the missile via the command portion of the data link.

In some cases, the operator is required to actually fly the missile to the designated target by continuously attempting to center the target on the video display. While in other cases, once the target is designated, the terminal sensor on the missile provides the necessary steering signals to guide the missile to the target. In the case in which the terminal sensor guides the missile, a guidance tracker typically provides a measure of the relative angular velocity between the missile and the target. The relative angular velocity is then used by the on-board guidance and navigation computer to fly the missile to the target.

Although MITL control has been used to successfully designate targets in various missile systems, conventional MITL control methods suffer from a number of deficiencies. Individually, and as a whole, these deficiencies reduce the overall effectiveness and user-friendliness of the missile system.

Most importantly, the inherent time delays in the data link between the missile and the control center may cause the MITL control loop to become unstable. In a conventional MITL system, the operator typically issues angular rate commands to the missile to position the terminal sensor over the target. Because of the time delay between designation of the target and the response of the terminal sensor, the operator generally issues azimuth and elevation gimbal rate commands which are greater than necessary to point the terminal sensor toward the target. When this happens, the sensor may overshoot the target, resulting in a pointing error. The operator is then likely to once again input gimbal rate commands which are greater than necessary to correct the overshoot and return the sensor to the proper pointing position. Each time the operator attempts to correct the cumulative overshoot, the gimbal rates diverge farther from the rates necessary to point the terminal sensor toward the designated target. As a result, the control loop becomes unstable. Even if the inherent time delays do not cause the control loop to become completely unstable, their effect is to destabilize the target designation process, and thus, they reduce the overall effectiveness of the MITL missile system.

For missiles which include a terminal sensor having a guidance tracker for providing steering signals to guide the missile to the desired target, the target which is tracked may not be the same as the target designated by the operator. For example, some trackers, known in the art as centroid trackers, provide steering signals to guide the missile to the centroid of a defined area in the image of the target. Typically, the geometry of the defined area is determined by thermal contrast of the target area as measured by infra-red sensors. The operator, however, may have selected a particular feature, other than the centroid, as the target. Although other guidance trackers define the image of the target differently, they often share the same characteristic error. As a result, they too can guide the missile to a target other than the designated target. In many cases, designating a desired target within the defined area of the target image is further complicated by characteristics of the target itself, the weather, and other uncontrollable variables.

Another problem inherent with conventional systems for MITL control is that the video images provided to the operator are generally not stable. Individual images are typically transmitted from the missile to the control center at a rate of from about ½ to about 30 frames per second. At the same time, the terminal sensor is continually subjected to the destabilizing forces generated by the flight of the missile. Accordingly, even at faster transmission rates, the images displayed to the operator can appear to flicker on the display. The flickering images on the display increase the skill level of the operator necessary to effectively designate the desired target.

SUMMARY OF THE INVENTION

It is accordingly an object of the invention to provide an improved system and method for MITL control of a remote aerial vehicle.

It is a more particular object of the invention to provide a system and method of designating a target for an airborne missile which substantially eliminates the inherent time delays between designation of the desired target and the response of the terminal sensor.

It is another object of the invention to provide a system and method of designating a target for an airborne missile which improves the overall effectiveness and user-friendliness of MITL control.

It is another object of the invention to provide a system and method of MITL control of a missile which allows an operator to select as the target a feature other than the centroid of a defined area of the image of the target.

It is another object of the invention to provide a system and method of MITL control of a missile which provides a stable image to the operator for target viewing and designation.

The above and other objects and advantages of the invention are achieved in the embodiments described by the provision of a system and method for MITL control of a remote aerial vehicle which permits an operator at a control center to designate a desired target from a continuously displayed video image of the target area generated and transmitted by imaging means mounted in the vehicle.

The system comprises a remote aerial vehicle which includes imaging means, in the form of an imaging sensor, for generating and transmitting a plurality of sequential video images of a predetermined target area to a control center. An operator at the control center guides the remote aerial vehicle toward a desired target within the target area by designating the desired target on a single video image generated and continuously transmitted by the imaging sensor of the vehicle.

The control center comprises a receiver for receiving the plurality of sequential video images from the remote aerial vehicle and a display operatively connected to the receiver for displaying the video images. Upon a command from the operator, an image selection means signals the remote aerial vehicle to continuously transmit a single video image from the plurality of sequential video images for display at the control center. The image selection means includes means for generating an image selection signal at the control center and means for transmitting the image selection signal to the remote aerial vehicle. Upon receipt of the image selection signal, the remote aerial vehicle continuously transmits one of the plurality of video images generated by the imaging sensor.

A target designation means at the control center permits the operator to designate a desired target from the continuously displayed video image. Upon a second command from the operator, the target designation means generates a target designation signal which corresponds to the azimuth and elevation position of the desired target on the display and transmits the target designation signal to the remote aerial vehicle.

The remote aerial vehicle further comprises receiving means for receiving the target designation signal and processing means for updating the position of the desired target and controlling the terminal sensor of the vehicle in response to the target designation signal. In particular, the processing means processes the target designation signal and then issues new azimuth and elevation gimbal rate commands to point the imaging sensor toward the designated target.

The remote aerial vehicle is typically an airborne missile, but it may also be an unmanned reconnaissance aircraft, or any other similar vehicle having a terminal sensor for guiding the vehicle to a predetermined target area from a control center or for estimating the location of objects on the ground. The imaging sensor is typically mounted in the nose of the missile and can include, for example, infra-red sensors which generate a video image of the target area based on thermal contrast of objects within the image of target area. The imaging sensor transmits a plurality of sequential video images of the target area, typically at a rate of from about ½ to about 30 frames per second, to the control center via the video portion of a communications data link established between the missile and the control center.

The receiver at the control center receives the video images and displays each sequential image on a video display to an operator. While viewing the sequential images, the operator activates the image selection means to command the imaging sensor to continuously transmit a single video image of the target area to be displayed on the display. At the command of the operator, an image selection signal is generated and transmitted from the control center to the missile by the image selection means. The image selection signal indicates to the missile that the operator is ready to initiate the target designation process.

Upon receipt of the image selection signal, the missile continuously transmits one of the plurality of sequential video images generated by the imaging sensor. At the same time, the current flight parameters, such as the position, velocity and attitude of the missile, and the orientation of the imaging sensor, are stored in the memory of the on-board guidance and navigation computer.

The operator next designates the desired target on the continuously transmitted video image displayed at the control center. The azimuth and elevation position of the designated target (corresponding to the cursor position) on the display is converted to a target designation signal by a processor at the control center, and the target designation signal is transmitted via the command portion of the data link to the missile.

When the target designation signal is received by the missile, the position of the missile at the time the continuously displayed video image was generated is recalled from the flight information stored in the guidance and navigation computer. The three dimensional coordinates of the target are then estimated from the position of the missile at the time the single video image was generated, the target designation signal (comprising a pointing vector from the vehicle to the target at the time the video image was generated), and the current position of the missile. The estimated coordinates of the target are then used to issue new pointing commands to the imaging sensor. In this manner, the time delay between generation of the continuously displayed video image, and receipt of the target designation signal by the missile is substantially eliminated.

In some instances, the missile can include a guidance tracker for tracking the target after the pointing commands to the imaging sensor have been updated in response to the target designation signal. The tracker typically provides a measure of the relative angular velocity between the missile and the estimated position of the target. When the missile includes a tracker, the guidance and navigation computer will guide the missile toward the designated target by periodically issuing updated pointing commands to the imaging sensor.

If the missile does not include a tracker, or the operator is not satisfied with the target being tracked by the tracker, the operator can designate the desired target again in order to refine the estimate of the target position and to generate new pointing commands for the imaging sensor. The process can be repeated as often as necessary to guide the missile to the desired target.

Because the inherent time delays in the MITL control of the missile are substantially eliminated, the system and method of the invention is simpler and easier to operate. Thus, less training of the operator is required than conventional systems and methods for designating a desired target for a missile. Hence, the overall effectiveness and user-friendliness of the system is increased.

A particular advantage of the system and method of the invention is that because the operator selects a single video image to be displayed continuously on the video display, the plurality of video images may be transmitted from the remote aerial vehicle at a low bandwidth frequency. For example, the video images may be transmitted by the vehicle and received by the control center at a rate of from about ½ frames per second to about 4 frames per second utilizing a satellite relay. Accordingly, the control center may be at any location, such as aboard a ship or at a remote land-based location, as long as the control center is within the range of reception of the satellite. Thus, many vehicles may be controlled from a single control center which is located a great distance from the vehicles.

As will be readily appreciated, the invention provides a system and method for designating a target which substantially eliminates the inherent time delay in the control loop between designation of the target by the operator and the response of the imaging sensor mounted in the remote aerial vehicle. The time delays are substantially eliminated because the operator designates the target from a single, continuously displayed video image of the target area. Once the desired target has been designated, the coordinates of the target are updated to account for the time delay between generation of the continuously displayed video image and receipt of the target designation signal. The updated estimate of the coordinates of the target are then used to generate and issue new pointing commands to the imaging sensor. As a result, the real-time target designation system and method of the invention is easier to use and more cost effective and is applicable to a data link which includes a low bandwidth frequency relay, such as a satellite.

BRIEF DESCRIPTION OF THE DRAWINGS

Some of the objects and advantages of the invention having been stated, others will appear as the description proceeds when considered in conjunction with the accompanying drawings in which like numerals denote the same ports in the different views, and in which.

DETAILED DESCRIPTION OF THE PREFERRED EMBODIMENTS

Figure 1:
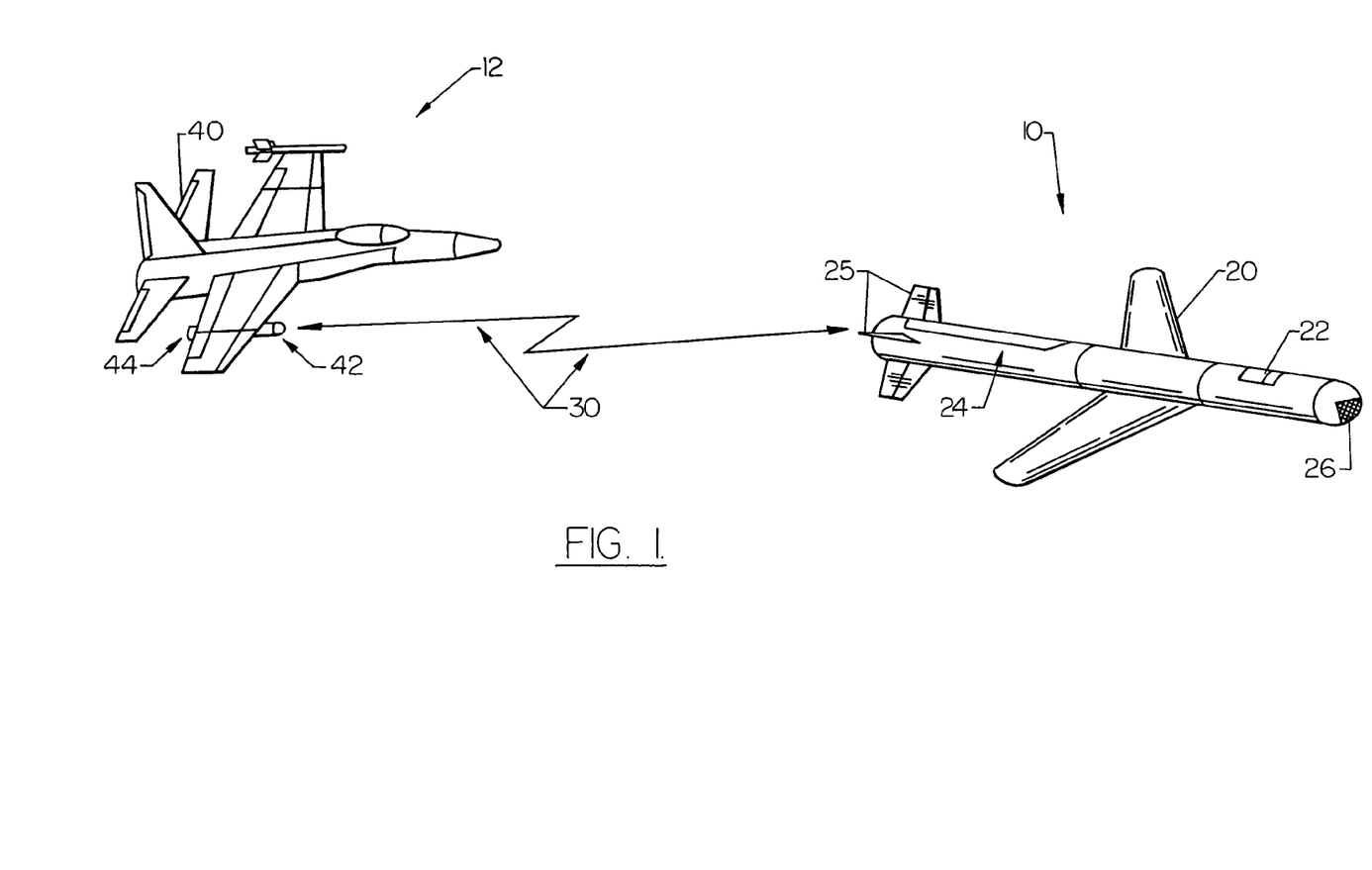
FIG. 1 is a schematic drawing illustrating one embodiment of the system and method of the invention in which the remote aerial vehicle is an airborne missile with a nose-mounted imaging sensor, and the control center is an aircraft.
Figure 2:
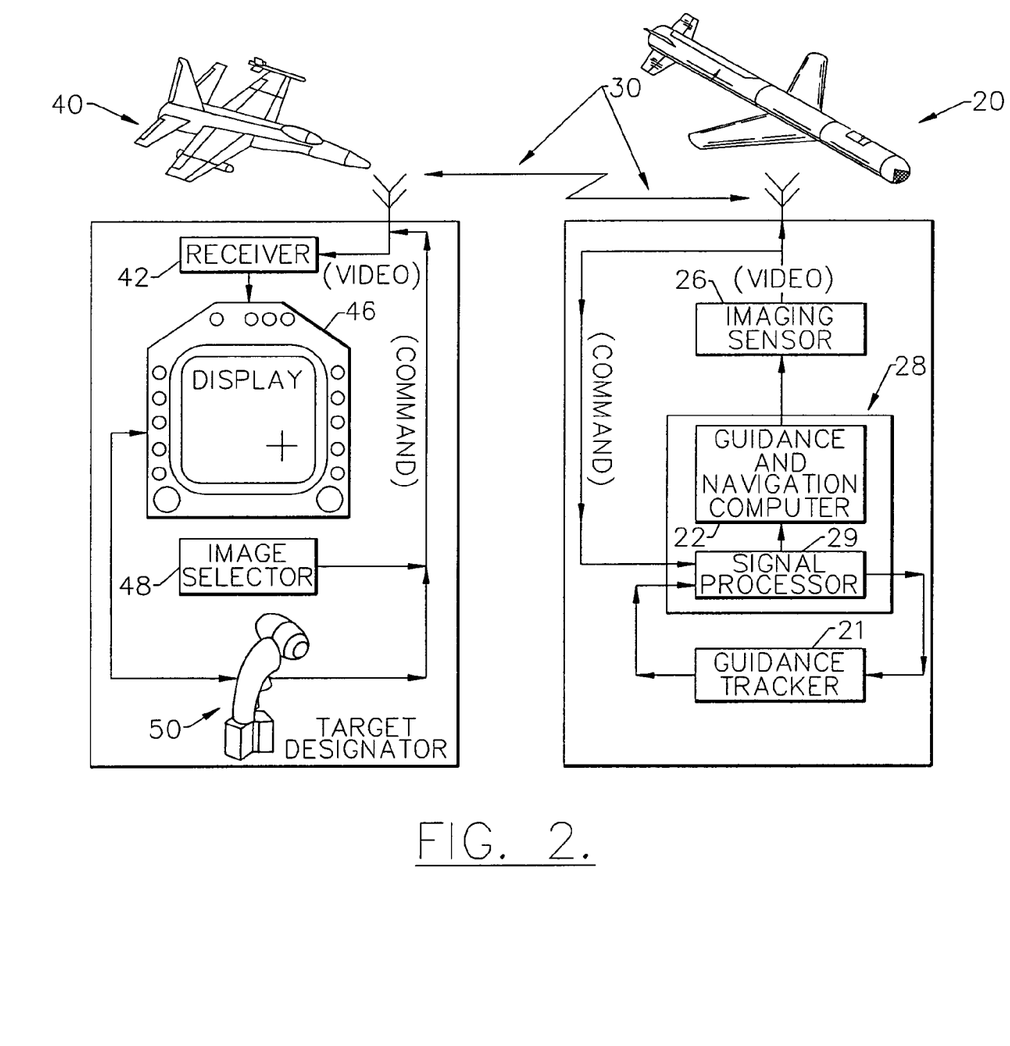
FIG. 2 is a block diagram illustrating the components of the system and method shown in FIG. 1.
Figure 3A:
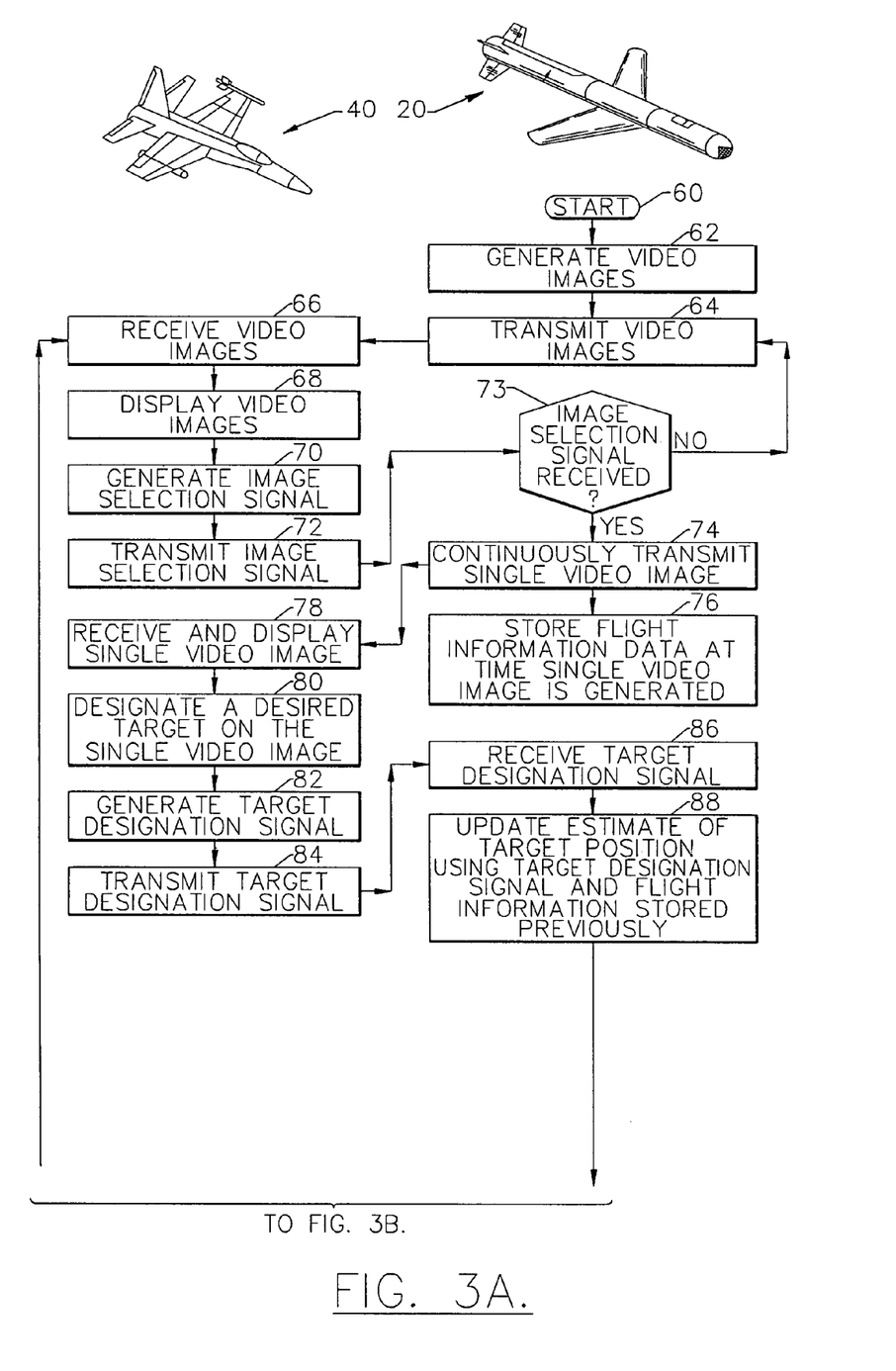
FIGS. 3A and 3B are a flow chart illustrating the operations of the system and method shown in FIG. 1.
Figure 3B:
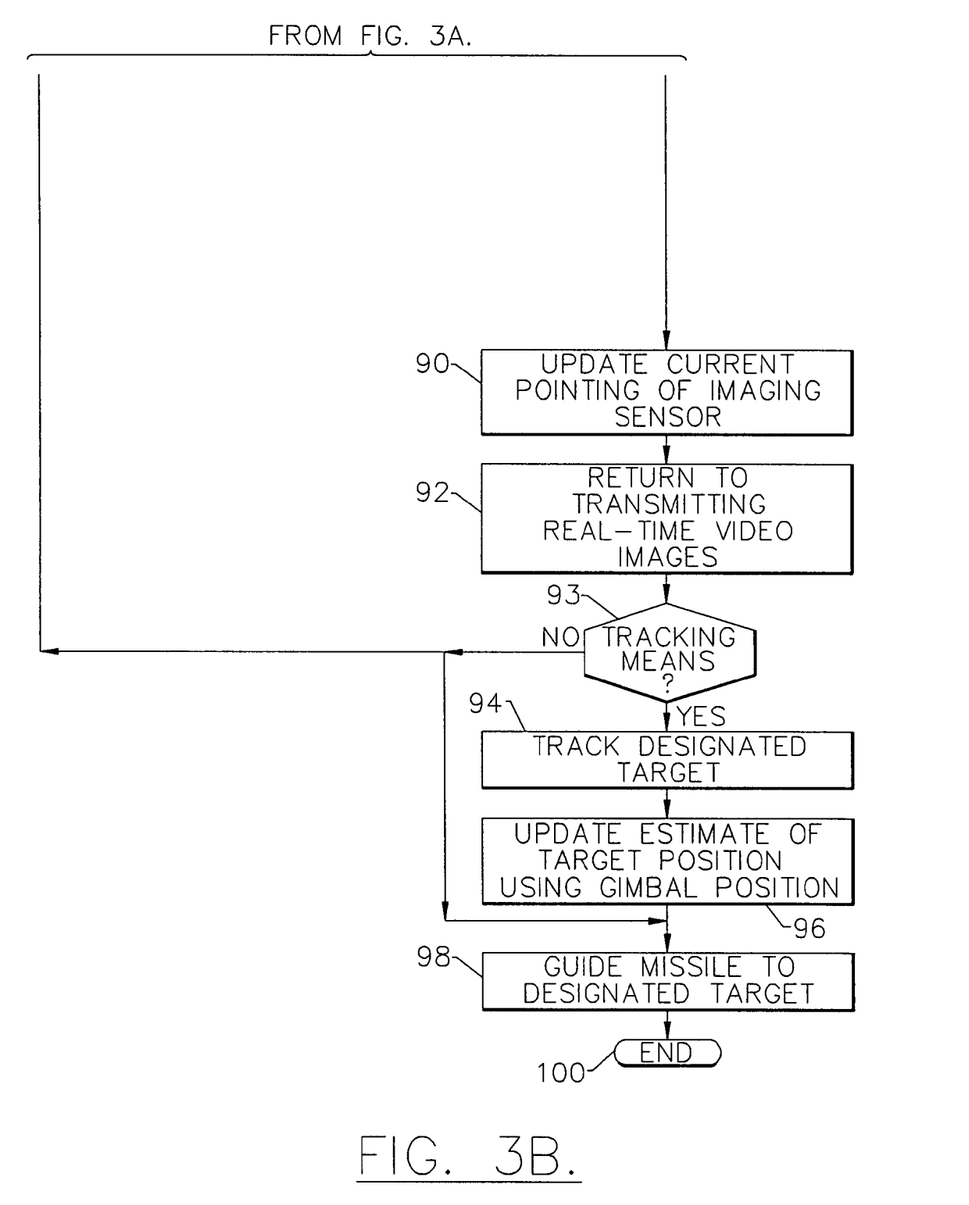

Referring more particularly to the drawings, FIGS. 1-3 illustrate one embodiment of the invention in which the remote aerial vehicle 10 is an airborne missile 20 and the control center 12 is an aircraft 40. For example, the aircraft may be a McDonnell Douglas F/A-18 airplane, and the missile may be a McDonnell Douglas Standoff Land Attack Missile Expanded Response (SLAM ER). The missile 20 is typically launched from the aircraft 40 and flown to a predetermined target area (not shown). Once the missile 20 is launched, a guidance and navigation computer 22 located inside the body 24 of missile 20 guides the missile along a pre-programmed trajectory. Guidance of the missile 20 is accomplished by adjusting the control surfaces 25 in response to commands issued by the guidance and navigation computer 22.

The missile 20 comprises imaging means 26, preferably located in the nose portion of the missile. Imaging means 26, however, may be located anywhere on the missile which provides an unobstructed view of the target area. The imaging means 26, for example, may comprise an infra-red camera having thermal sensors for generating video images based on thermal contrast of objects within the target area. As a further example, other possible imaging means include a TV sensor which operates in the visual range.

When the missile 20 is within range of the predetermined target area, the guidance and navigation computer 22 activates the imaging means 26. The imaging means 26 thereafter generates a plurality of sequential video images of the target area. The video images may be generated in any predetermined format which may be readily transmitted via a conventional communications data link having a video portion, and which may be readily received for display at aircraft 40.

The imaging means 26 transmits the plurality of sequential video images via the video portion of a data link 30 established between the missile 20 and the aircraft 40. The aircraft 40 comprises a data pod 44, generally located on the wing of the aircraft, which includes a receiver 42 for receiving the plurality of sequential video images from the missile 20. The video images may be transmitted and received at any conventional frequency; however, imaging means 26 typically transmits and receiver 42 typically receives the video images at a frequency of from about ½ frames per second to about 30 frames per second. In one embodiment of the invention, the video images are preferably transmitted and received at a relatively low bandwidth frequency of from about ½ frames per second to about 4 frames per second for a purpose to be discussed hereafter.

As illustrated in the block diagram of FIG. 2, a display 46 is operatively connected to the receiver 42. In one embodiment, the display 46 is integrated with the cockpit of an F/A-18 aircraft, and the video images are processed for real-time display by an image processor located within the data link pod 44 on the wing of the aircraft. After processing, the video images are routed from the data link pod 44 to the display 46 in the cockpit of the aircraft 40.

Aircraft 40 comprises image selection means 48 for indicating to the missile 20 that the operator is ready to initiate the target designation process. Image selection means 48 may comprise, for example, a button or switch which is activated by the operator to command the imaging means 26 of the missile 20 to store and transmit a single video image while filtering all subsequent images. The operator initiates the image selection process by commanding the image selection means 48 to generate an image selection signal. The image selection signal is then transmitted by image selection means 48 via a command portion of data link 30 to the missile 20.

Upon receipt of the image selection signal from image selection means 48, imaging means 26 continuously transmits a single video image from missile 20, via the video portion of data link 30, to be displayed on display 46 of aircraft 40. At the same time, the current flight information, such as the position, velocity and attitude of the vehicle, and the orientation of the imaging means 26, are stored in the guidance and navigation computer 22 of missile 20 for a purpose to be discussed hereafter.

Once the single video image is continuously displayed on display 46, the operator designates the desired target for the missile 20. In the illustrated embodiment, aircraft 40 comprises target designation means 50 for permitting the operator to designate the desired the target and for generating and transmitting a target designation signal. Although the process of designating the desired target may be automated, preferably the operator manually locates and designates the desired target. In the embodiment illustrated in FIGS. 1-3, the target designation means 50 comprises a slew stick in the cockpit of aircraft 40 for designating the desired target on the continuously displayed video image on display 46. The target is designated, for example, by positioning the cursor generated by cursor generating means (not shown) on the aircraft 40 and superimposed on the continuously displayed video image over the desired target and then releasing the button.

Target designation means 50 processes the azimuth and elevation of the cursor position in the selected video image, and converts the two-dimensional representation of the position of the desired target on the displayed video image to a target designation signal. The target designation signal is then transmitted by target designation means 50 via the command portion of data link 30 to missile 20. As will be explained in greater detail, the target designation signal is then processed by a processor means 28 on missile 20 such that the guidance and navigation computer 22 provides new pointing commands to the imaging means 26.

Processing means 28 comprises a signal processor 29 for receiving the target designation signal generated and transmitted by target designation means 50 and for estimating the three-dimensional coordinates of the target, and for controlling the missile in response to the target designation signal.

After receiving and updating the target designation signal, processing means 28 supplies the updated estimate of the coordinates of the target to the guidance and navigation computer 22. The guidance and navigation computer 22 in turn generates the necessary new pointing commands for the imaging means 26 to guide the missile 20 toward the designated target.

Preferably, processing means 28 utilizes the target designation signal to estimate the coordinates of the target from the flight information stored in the guidance and navigation computer 22. Specifically, processing means 28 uses the position of missile 20 at the time the continuously displayed video image was generated, the target designation signal (corresponding to the azimuth and elevation of the cursor position in the selected video image at the time the image was generated), and the current position of the missile to estimate the three-dimensional coordinates of the target. The estimate of the position of the target is thus an updated three-dimensional representation of the position of the desired target. The updated target position is then used to issue updated pointing commands to the imaging means 26 based on the current flight information stored in the guidance and navigation computer 22.

Although any number of computing means may be used to update the target position, a five-state Kalman filter is preferred. The Terminal Kalman Filter (TKF) utilized in the embodiment illustrated in FIGS. 1-3 includes target position error states in three orthogonal dimensions, and azimuth and elevation gimbal bias states. The TKF uses the azimuth and elevation cursor position embedded in the target designation signal, along with the flight information stored in the guidance and navigation computer 22 at the time that the continuously displayed video image was generated (as described above) to estimate the updated target position and any gimbal errors. The updated target position is thereafter provided to the guidance and navigation computer 22 to issue new pointing commands to the imaging means 26 based on the current position, velocity and attitude of the missile 20.

In some embodiments, the imaging means 26 of missile 20 comprises tracking means 21 for tracking the designated target once the updated estimate of the target position is processed by processing means 28. Typically, tracking means 21 is operatively connected to imaging means 26 through signal processor 29 so that guidance and navigation computer 22 may monitor and continuously refine the estimate of the updated target position to accurately guide missile 20 toward the designated target. In other embodiments, which do not comprise tracking means 21, the image selection means 48 and the target designation means 50 are repeatedly used by the operator to refine the estimate of the updated target position until the missile 20 reaches the designated target. This same process can be used in the event that the operator is not satisfied with the performance of the tracking means 21 as discussed above.

Missile 20 is directed toward a designated target within a predetermined target area from aircraft 40 according to the operations illustrated in FIGS. 3A and 3B. In particular, a plurality of sequential video images of the predetermined target area is generated by imaging means 26 and transmitted via data link 30 to aircraft 40 as illustrated in blocks 62 and 64, respectively. The receiver 42 at the aircraft 40 receives the video images from imaging means 26 as illustrated in block 66. Image selection means 48 displays the video images on display 46 as illustrated in block 68. At a command from the operator, image selection means 48 generates an image selection signal which indicates that the operator is ready to receive a single video image to be continuously displayed on display 46 and transmits the image selection signal to missile 20 as illustrated in blocks 70 and 72, respectively.

Upon receipt of the image selection signal, as illustrated in block 73, the imaging means 26 continuously transmits a single video image as illustrated in block 74. At the same time that the single video image is generated by imaging means 26, flight information, such as the position, velocity, and attitude of the missile 20, and the orientation of the imaging means 26, is stored in guidance and navigation computer 22 as illustrated in block 76. The continuously transmitted video image is received at aircraft 40 by receiver 42 and displayed on display 46 as illustrated in block 78.

As illustrated in blocks 80, 82 and 84 respectively, target designation means 50 permits the operator to designate a desired target from the video image continuously displayed on display 46 then generates a target designation signal corresponding to the cursor position of the target on the display 46, and then transmits the target designation signal to missile 20. The target designation signal is received by processing means 28 at missile 20 as illustrated in block 86 and processed to update the estimate of the position of the target from the target designation signal and the flight information previously stored in guidance and navigation computer 22 as illustrated in block 88. The guidance and navigation computer 22 next computes new pointing commands in response to the updated estimate of the target position and updates the pointing commands to imaging means 26 as illustrated in block 90 (FIG. 3B).

As illustrated in block 92, imaging means 26 resumes transmitting real-time, sequential video images of the target area. If missile 20 comprises tracking means 21 as illustrated in block 93, the tracking means tracks the designated target as illustrated in block 94, and the TKF periodically updates the estimate of the target position using the positions of the azimuth and elevation gimbals of the missile as illustrated in block 96.

If missile 20 does not comprise tracking means 21 as likewise illustrated in block 93, the operator can command image selection means 48 to generate and transmit another image selection signal to missile 20 instructing imaging means 26 to continuously transmit another video image to the aircraft 40 to be displayed on display 46. The operator then designates the desired target again, which causes another target designation signal to be generated and transmitted by target designation means 50 to missile 20 to be processed by processing means 28. In this manner, the operator can repeatedly designate the same desired target until the missile 20 is guided to the target, or the operator can designate a different target for the missile. Regardless, either the tracking means 21 or the operator guides the missile toward the designated target by repeatedly designating the desired target, as illustrated in block 98.

Figure 4:
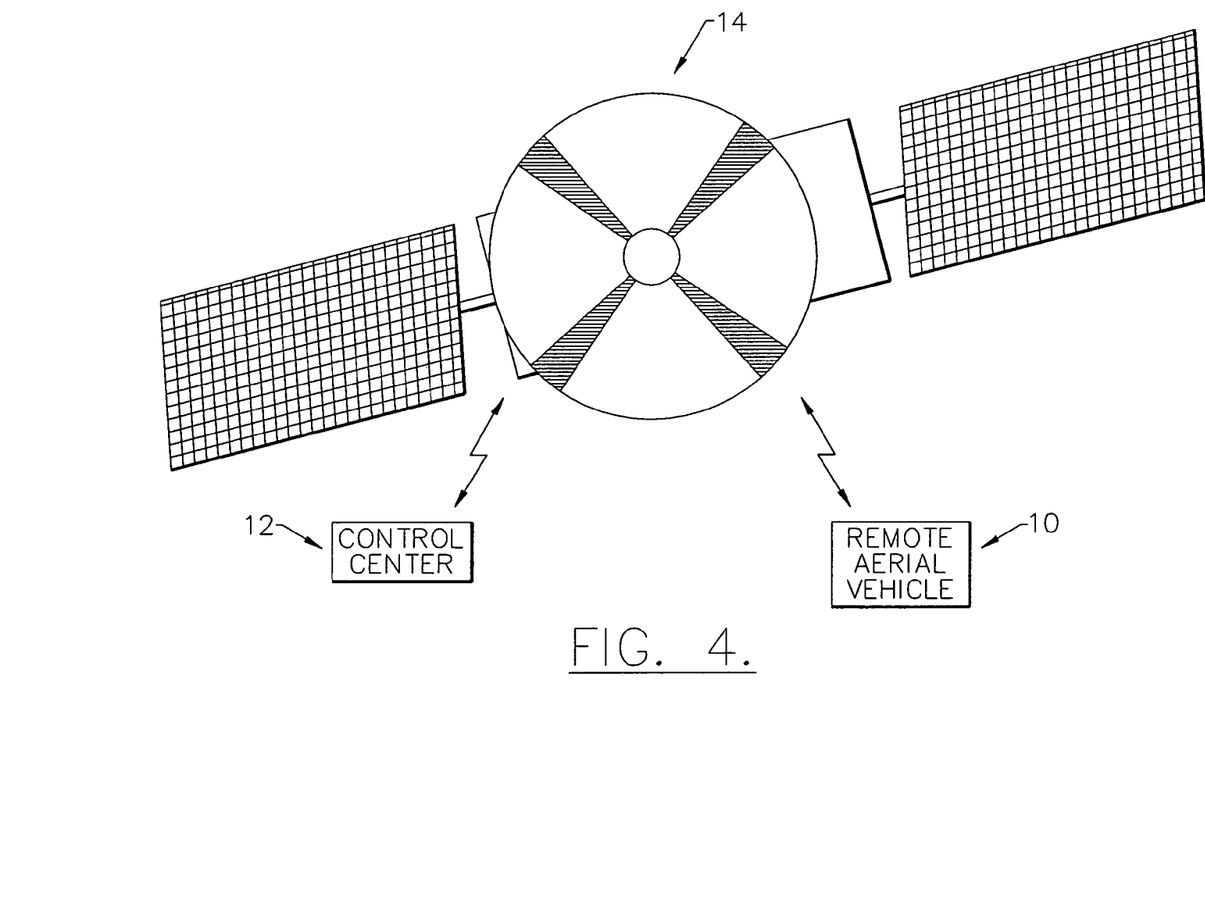
FIG. 4 is a schematic drawing illustrating another embodiment of the system and method of the invention in which the data link between the remote aerial vehicle and the control center includes a satellite relay.

Other embodiments of the invention comprise the use of a satellite relay 14 in the data link 30 between the remote aerial vehicle 10 and the control center 12. As illustrated in FIG. 4, remote aerial vehicle 10 may be any type of vehicle which is launched and flown in the direction of a predetermined target area. For example, remote aerial vehicle 10 may be a missile 20, as described in the embodiment illustrated in FIGS. 1-3, an unmanned reconnaissance aircraft or other similar vehicle. Likewise, control center 12 may be positioned at any suitable location from which communication with the remote aerial vehicle 10 can be established via satellite relay 14, such as land-based, ship-based or aircraft-based.

Satellite relay 14 receives and relays data most efficiently at relatively low bandwidth frequencies of from about ½ frames per second to about 4 frames per second. With the invention, MITL control for real-time target designation may be accomplished at low bandwidth frequencies. Thus, the invention permits the use of a satellite relay 14 in the data link 30 between remote aerial vehicle 10 and control center 12. Accordingly, control center 12 may be positioned at any location within the reception of satellite relay 14. For example, control center 12 may be positioned aboard a remote airborne command aircraft which is capable of designating desired targets for a number of missiles at the same time. In addition, control center 12 may be positioned aboard a ship or may be based on land at a great distance from the predetermined target area.

In the drawings and the specification, there has been set forth certain embodiments of the invention, and although specific terms are employed, they are used in a generic and descriptive sense only and not for purposes of limitation. Accordingly, there are many embodiments of the invention which have not been described which nevertheless are included within the broad scope of the invention.

That which is claimed is:

1. A combination of a remote aerial vehicle and a control center for guiding the remote aerial vehicle toward a designated target:
   said remote aerial vehicle comprising imaging means for generating and transmitting a series of video images of a target area;
   said control center comprising:
      a receiver for receiving the series of video images from the imaging means,
      a display operatively connected to said receiver for displaying the series of video images,
      image selection means for signalling said imaging means to generate and transmit one of the series of video images to thereafter be continuously displayed on said display, and
      target designation means for permitting designation of a target on the one video image continuously displayed on said display and for generating and transmitting a target designation signal to said remote aerial vehicle;
   said remote aerial vehicle further comprising processing means for receiving the target designation signal and for controlling said remote aerial vehicle in response to the target designation signal to thereby guide said remote aerial vehicle toward the designated target,
   wherein said processing means comprises computing means for updating the target designation signal to compensate for a time delay between generation of the one video image continuously displayed on said display and receipt of the target designation signal by said processing means, wherein the processing means is configured to estimate three-dimensional coordinates of the designated target in order to update the target designations signal based upon a position of the remote aerial vehicle upon generation of the one video image continuously displayed on said display, an azimuth and elevation of the designated target on the one video image continuously displayed on said display and a current position of the remote aerial vehicle, and
   wherein the remote aerial vehicle is configured to provide updated pointing commands to the imaging means based upon the three-dimensional coordinates estimated for the designated target.

2. The combination of claim 1 wherein said computing means for updating the target designation signal comprises a Terminal Kalman Filter.

3. The combination of claim 1 wherein said processing means further comprises tracking means for tracking the updated target designation signal.

4. The combination of claim 1 wherein said imaging means comprises an imaging sensor for generating the series of video images.

5. The combination of claim 4 wherein said imaging sensor comprises an infra-red camera.

6. The combination of claim 4 wherein said imaging sensor comprises a television camera in the visual range.

7. The combination of claim 1 wherein said imaging means for generating and transmitting the series of video images and said receiver for receiving the series of video images transmit and receive, respectively, at a frequency of from about ½ frames per second to about 30 frames per second.

8. The combination of claim 1 wherein said remote aerial vehicle is selected from the group consisting of an airborne missile and an unmanned reconnaissance aircraft.

9. The combination of claim 1 wherein said remote aerial vehicle is a Standoff Land Attack Missile Expanded Range (SLAM ER).

10. The combination of claim 1 wherein said imaging means transmits the series of video images to a satellite which relays the video images to said control center and wherein said target designation means transmits the target designation signal to a satellite which relays the target designation signal to said remote aerial vehicle.

11. The combination of claim 10 wherein said imaging means for generating and transmitting the series of video images and said receiver for receiving the series of video images transmit and receive, respectively, at a frequency of from about ½ frames per second to about 4 frames per second.

12. The combination of claim 10 wherein said control center is selected from the group consisting of an airborne aircraft, a ship and a land-based control center.

13. The combination of claim 1 wherein the imaging means is further configured to resume transmission of the series of video images of the target area in response to the target designation signal.

14. A control center system for guiding a remote aerial vehicle toward a designated target, said control center system comprising:
   a receiver for receiving a series of video images of a target area from said remote aerial vehicle,
   a display operatively connected to said receiver for displaying the series of video images,
   image selection means for signalling said remote aerial vehicle to transmit one of the series of video images to thereafter be continuously displayed on said display, and
   target designation means for permitting selection of a designated target on the one video image continuously displayed on said display and for generating and transmitting a target designation signal to thereby guide said remote aerial vehicle toward the designated target,
   wherein the target designation signal is thereafter updated to compensate for a time delay between generation of the one video image continuously displayed on said display and receipt of the target designation signal by said remote aerial vehicle, by estimating three-dimensional coordinates of the designated target in order to update the target designations signal based upon a position of the remote aerial vehicle upon generation of the one video image continuously displayed on said display, an azimuth and elevation of the designated target on the one video image continuously displayed on said display and a current position of the remote aerial vehicle such that said remote aerial vehicle operates in accordance with updated pointing commands that are based upon the three-dimensional coordinates estimates for the designated target.

15. A method of guiding a remote aerial vehicle toward a designated target from a control center comprising the steps of:
 a) generating and transmitting a series of video images of a predetermined target area from the remote aerial vehicle to the control center,
 b) displaying the series of video images on a video display at the control center,
 c) signalling the remote aerial vehicle to generate and transmit one of the series of video images to thereafter be continuously displayed on the video display,
 d) designating, with target designation means, a target on the one video image continuously displayed on the video display,
 e) transmitting a target designation signal corresponding to the position of the designated target to the remote aerial vehicle, and
 f) controlling, with processing means, the remote aerial vehicle in response to the target designation signal to thereby guide the remote aerial vehicle toward the designated target,
 wherein the step of controlling the remote aerial vehicle further comprises the step of computing an updated target designation signal to compensate for a time delay between generation of the one video image continuously displayed on the video display and receipt of the target designation signal at the remote aerial vehicle, wherein computing the updated target designation signal comprises estimates three-dimensional coordinates of the designated target in order to update the target designations signal based upon a position of the remote aerial vehicle upon generation of the one video image continuously displayed on said display, an azimuth and elevation of the designated target on the one video image continuously displayed on said display and a current position of the remote aerial vehicle, and
 wherein controlling the remote aerial vehicle comprises providing updated pointing commands based upon the three-dimensional coordinates estimated for the designated target.

16. The method of claim 15 wherein the step of controlling the remote aerial vehicle further comprises the step of tracking the updated target designation signal.

17. The method of claim 15 wherein said signalling step, said designating step, said step of transmitting a target designation signal and said controlling step are repeated to further refine the target designation signal.

18. The method of claim 15 wherein said step of generating and transmitting the series of video images comprises transmitting the video images to a satellite and wherein said step of transmitting a target designation signal comprises transmitting the target designation signal to a satellite.

19. The method of claim 15 further comprising resuming transmission of the series of video images of the target area in response to the target designation signal.

20. A method of man-in-the-loop control of a remote aerial vehicle whereby a target for the remote aerial vehicle is designated from a control center, the remote aerial vehicle comprising a guidance and navigation computer and a terminal sensor having an infra-red camera, said method comprising the steps of:
 a) initializing the guidance and navigation computer by providing predetermined target area coordinates and trajectory commands to the remote aerial vehicle,
 b) generating a series of video images of a target area with the infra-red camera,
 c) establishing a video data link between the remote aerial vehicle and the control center,
 d) transmitting the series of video images to the control center via the video data link,
 e) displaying the series of video images on a video display at the control center,
 f) signalling the remote aerial vehicle to generate and transmit one of the series of video images to thereafter be continuously displayed on the video display,
 g) designating, with target designation means, the target for the remote aerial vehicle on the one video image continuously displayed on the video display,
 h) generating a target designation signal corresponding to the designated target for the remote aerial vehicle,
 i) establishing a command signal data link between the control center and the remote aerial vehicle,
 j) transmitting the target designation signal via the command signal data link to the remote aerial vehicle,
 k) computing an updated target designation signal from the target designation signal to compensate for a time delay between generation of the one video image by the remote aerial vehicle and receipt of the target designation signal at the remote aerial vehicle, wherein computing the updated target designated signal comprises estimating three-dimensional coordinates of the designated target in order to update the target designations signal based upon a position of the remote aerial vehicle upon generation of the one video image continuously displayed on said display, an azimuth and elevation of the designated target on the one video image continuously displayed on said display and a current position of the remote aerial vehicle, and
 l) controlling, with processing means, the remote aerial vehicle in response to the updated target designation signal to thereby guide the remote aerial vehicle toward the designated target, wherein controlling the remote aerial vehicle comprises providing updated pointing commands based upon the three-dimensional coordinates estimated for the designated target.

* * * * *